(12) United States Patent
Nagata (10) Patent No.: US 11,852,362 B2
(45) Date of Patent: Dec. 26, 2023

(54) BLOWER (71) Applicant: DENSO CORPORATION, Kariya (JP)

(72) Inventor: Ippei Nagata, Kariya (JP)

(73) Assignee: DENSO CORPORATION, Kariya (JP)

(*) Notice: Subject to any disclaimer, the term of this patent is extended or adjusted under 35 U.S.C. 154(b) by 248 days.

(21) Appl. No.: 17/215,659

(22) Filed: Mar. 29, 2021

(65) Prior Publication Data
US 2021/0215359 A1 Jul. 15, 2021

Related U.S. Application Data (63) Continuation of application No. PCT/JP2019/039152, filed on Oct. 3, 2019.

(30) Foreign Application Priority Data

Nov. 19, 2018 (JP) .................... 2018-216356

(51) Int. Cl.
F24F 1/38 (2011.01)
F04D 29/44 (2006.01)
F24F 1/0018 (2019.01)

(52) U.S. Cl.
CPC ............... *F24F 1/38* (2013.01); *F04D 29/44* (2013.01); *F24F 1/0018* (2013.01)

(58) Field of Classification Search
CPC .. F04D 29/281; F04D 29/289; F04D 29/4213; F04D 29/4226; F04D 29/441; F04D 17/16; F04D 25/08; F24F 1/0035; F24F 1/0038; F24F 1/0041; F24F 1/38; B60H 2001/00085; B60H 2001/00092; F05D 2250/51
See application file for complete search history.

(56) References Cited

U.S. PATENT DOCUMENTS

2013/0004329 A1* 1/2013 Shiraichi ................. F04D 17/10
416/243

FOREIGN PATENT DOCUMENTS

| JP | 201835792 | * | 3/2018 |
| JP | 2018035792 A | | 3/2018 |
| WO | WO-2018074339 A1 | | 4/2018 |

* cited by examiner

*Primary Examiner* — Brian O Peters
(74) *Attorney, Agent, or Firm* — Harness, Dickey & Pierce, P.L.C.

(57) ABSTRACT

A blower includes: an outside/inside air box into which outside air and inside air are introduced; an impeller to suck and blow out air introduced into the air box; a casing having a bell mouth that forms an air suction port to the impeller, the casing forming a ventilation passage on an outer side of the impeller in a radial direction; and a plate-shaped member provided with a predetermined gap relative to the casing and the bell mouth. A gap passage is defined between the casing and the plate-shaped member. A guide rib is provided at a part of the gap passage opposite to an opening through which air flows into the gap passage. The guide rib guides air flowing through the gap passage in a circumferential direction of the bell mouth.

7 Claims, 9 Drawing Sheets

BLOWER

CROSS-REFERENCE TO RELATED APPLICATIONS

The present application is a continuation application of International Patent Application No. PCT/JP2019/039152 filed on Oct. 3, 2019, which designated the U.S. and claims the benefit of priority from Japanese Patent Application No. 2018-216356 filed on Nov. 19, 2018. The entire disclosures of all of the above applications are incorporated herein by reference.

TECHNICAL FIELD

The present disclosure relates to a blower.

BACKGROUND

A blower is used for a two-layer flow air conditioner, in which air inside a cabin and air outside the cabin can be simultaneously blown out in separated state from each other.

SUMMARY

According to one aspect of the present disclosure, a blower includes: an air box into which outside air and inside air are introduced; an impeller that is rotated by a motor to suck and blow out air introduced into the air box; a casing having a bell mouth that forms an air suction port to the impeller, the casing forming a ventilation passage on an outer side of the impeller in a radial direction; and a plate-shaped member provided with a predetermined gap relative to the casing and the bell mouth. The plate-shaped member covers at least a part of a region of the casing, the bell mouth, and the impeller in an axial direction. A gap passage is defined between the casing and the plate-shaped member such that air flowing into the gap passage flows in a direction intersecting a rotation axis of the impeller and is sucked into the impeller from the bell mouth. A guide rib is provided at a part of the gap passage opposite to an opening through which air flows into the gap passage. The guide rib guides air flowing through the gap passage in a circumferential direction of the bell mouth.

DESCRIPTION OF EMBODIMENTS

To begin with, examples of relevant techniques will be described.

A blower is used for an air conditioner, to send a two-layer flow of inside air and outside air which can be simultaneously blown out in a state separated from each other. As such a blower, a one-sided suction type centrifugal blower sucks air from only one side in the rotation axis direction of the impeller. In the blower, air taken in from an air intake housing (hereinafter referred to as inside/outside air box) is sucked into the impeller via a filter and blown out to a ventilation passage in the casing surrounding the radially outside of the impeller. The ventilation passage in the casing is divided into an upper ventilation passage on one side in the axial direction of the impeller and a lower ventilation passage on the other side in in the axial direction by a partition wall. Further, a separation cylinder is provided inside the impeller in the radial direction for separating the air taken in from the inside/outside air box into the upper ventilation passage and the lower ventilation passage. The separation cylinder is shaped to extend radially outward from an air inlet portion formed in a baffle plate provided in a part of the region between the impeller and the filter through the radially inside of the impeller.

Air flowing from the inside/outside air box to the baffle plate passes through the inside of the separation cylinder from the air inlet portion provided in the baffle plate, and flows to the lower ventilation passage through the impeller. A part of the air flowing from the inside/outside air box to a region excluding the baffle plate is radially sucked into the impeller from the bell mouth provided on the upper surface of the casing and flows into the upper ventilation passage. The other air flowing to the region other than the baffle plate flows into a gap passage formed between the baffle plate and the upper surface of the casing, and is sucked into the impeller from the bell mouth to flow through the upper ventilation passage.

As a result of detailed studies by the inventor, the following issues are found in the centrifugal blower. In the centrifugal blower, the inside/outside air box and the baffle plate are rectangular when viewed in the rotation axis direction of the impeller. Therefore, a distance between the corner portion of the baffle plate and the inner circumferential surface of the bell mouth is long in the gap passage formed between the baffle plate and the upper surface of the casing. As a result, an air flow stagnates near the corner portion of the baffle plate in the gap passage. Since the air stagnates at the corner portion, the pressure loss of air flowing through the gap passage increases.

Further, the centrifugal blower used in the air conditioner for a vehicle is required to reduce the size of the impeller in the axial direction (that is, the height direction of the centrifugal blower). If the height of the centrifugal blower is reduced by decreasing the gap passage between the baffle plate and the upper surface of the casing, the air flowing in the gap passage further stagnates. In that case, the pressure loss of air flowing through the gap passage becomes larger due to the stagnation of the air near the corner portion of the baffle plate in the gap passage. As a result, the amount of air blown by the blower decreases.

The present disclosure provides a blower capable of reducing pressure loss and increasing the amount of air blown by the blower.

According to one aspect of the present disclosure, a blower includes: an air box into which outside air and inside air are introduced; an impeller that is rotated by a motor to suck and blow out air introduced into the air box; a casing having a bell mouth that forms an air suction port to the impeller, the casing forming a ventilation passage on an outer side of the impeller in a radial direction; and a plate-shaped member provided with a predetermined gap relative to the casing and the bell mouth. The plate-shaped member covers at least a part of a region of the casing, the bell mouth, and the impeller in a rotation axis direction. A gap passage is defined between the casing and the plate-shaped member such that air flowing into the gap passage flows in a direction intersecting a rotation axis of the impeller and is sucked into the impeller from the bell mouth. A guide rib is provided at a part of the gap passage opposite to an opening through which air flows into the gap passage. The guide rib guides air flowing through the gap passage in a circumferential direction of the bell mouth.

Accordingly, the air flowing through the gap passage is guided in the circumferential direction of the bell mouth by the guide rib, and is sucked into the impeller from the radially inside of the bell mouth. Therefore, it is possible to restrict the stagnation of air in the gap passage. In addition, air flowing into the gap passage from one side in the radial direction across the rotation axis of the impeller and air flowing into the gap passage from the other side in the radial direction are guided by the guide rib in the circumferential direction of the bell mouth, before the air flows into the gap passage through the opening. Therefore, the flows of air collide with each other in the gap passage and merge, so that the air is easily sucked into the impeller. Therefore, it is possible to reduce the pressure loss of air sucked into the impeller from the air box through the gap passage, and to increase the amount of air blown by the blower.

Embodiments of the present disclosure will now be described with reference to the drawings. Parts that are identical or equivalent to each other in the following embodiments are assigned the same reference numerals and will not be described.

First Embodiment

A first embodiment will be described with reference to the drawings. A blower 1 of the present embodiment is a one-sided suction type centrifugal blower that sucks air from only one side in a rotation axis direction of an impeller 30. The blower 1 is used in a two-layer-flow air conditioner for a vehicle, which can blow out inside air inside the cabin and outside air outside the cabin simultaneously while separating the inside air and the outside air from each other.

As shown in FIGS. 1 to 4, the blower 1 includes an inside/outside air box 10, the impeller 30, a casing 40, a partition wall 46, a baffle plate 50 as a plate-like member, a separation cylinder 53, and a guide rib 70.

Figure 1:
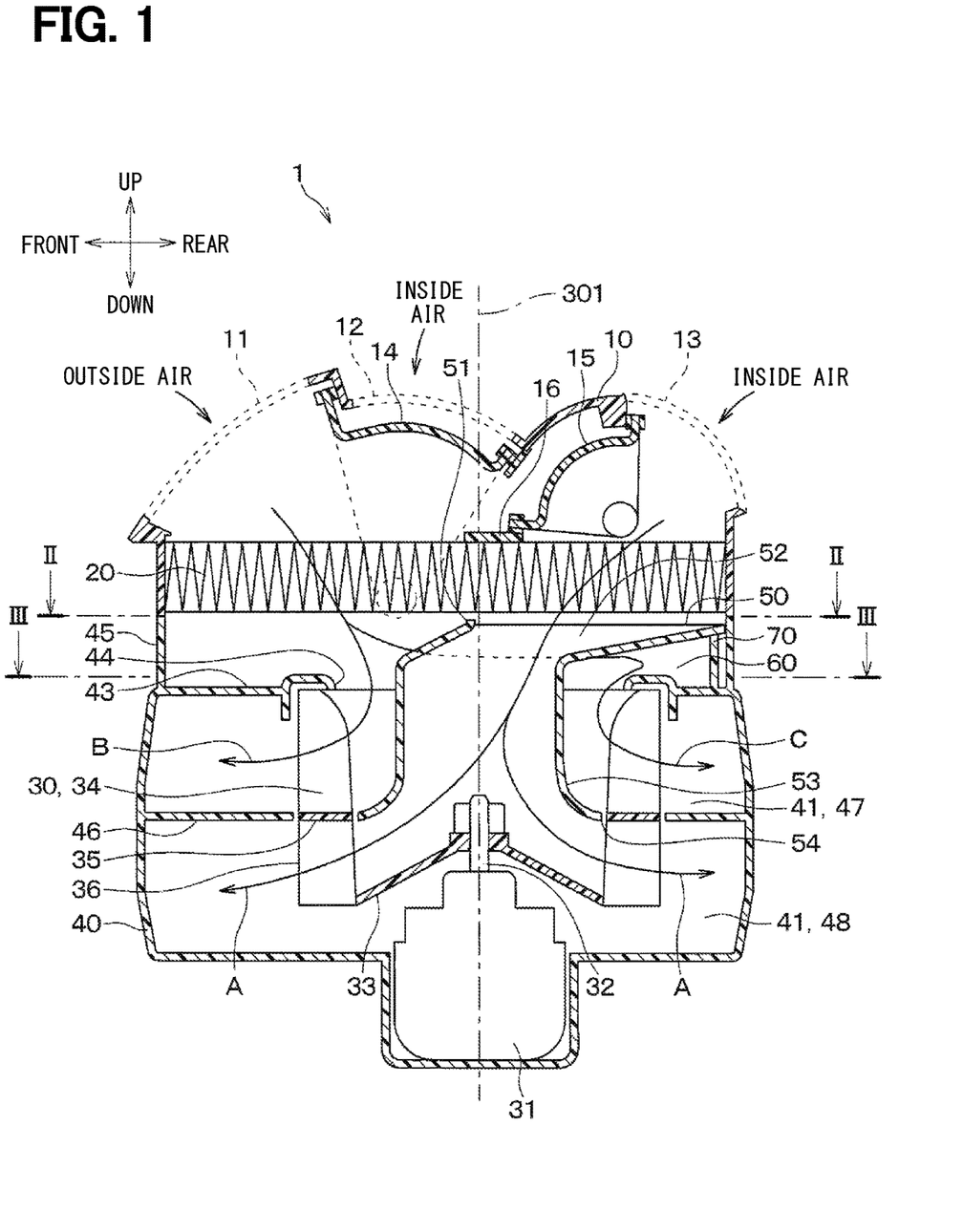
FIG. 1 is a cross-sectional view of a blower according to a first embodiment.

The inside/outside air box 10 is arranged at an upper part of the blower 1. The inside/outside air box 10 has an outside air introduction port 11, a first inside air introduction port 12, and a second inside air introduction port 13 in this order from the front side of the vehicle. Outside air is introduced into the outside air introduction port 11. Inside air is introduced into the first inside air introduction port 12 and the second inside air introduction port 13. A first switching door 14 and a second switching door 15 are provided inside the inside/outside air box 10. The first switching door 14 can selectively open and close the outside air introduction port 11 and the first inside air introduction port 12. The second switching door 15 can open and close the second inside air introduction port 13. The first switching door 14 and the second switching door 15 are, for example, a rotary door.

A filter 20 is provided at the lower part of the inside/outside air box 10 to collect a foreign substance contained in the air (that is, the outside air and the inside air) introduced into the inside/outside air box 10. The filter 20 is configured, for example, by folding a dust-removing filter medium having a predetermined air permeability. The filter 20 is formed by being folded in an arrangement direction in which the outside air introduction port 11, the first inside air introduction port 12, and the second inside air introduction port 13 are arranged (for example, in the front-rear direction of the vehicle). In other words, the folded parts of the filter 20 have a longitudinal direction (for example, in the vehicle width direction) extending perpendicularly to the arrangement direction in which the outside air introduction port 11, the first inside air introduction port 12, and the second inside air introduction port 13 are arranged. The inside/outside air box 10 and the filter 20 are formed in a rectangular shape when viewed from the upper side. The rectangular shape may be a quadrangle, and the corner of the quadrangle may be chamfered by a curved line or a straight line.

The impeller 30 is a centrifugal fan that is rotated by a motor 31. The impeller 30 has a main plate 33 fixed to a shaft 32 of the motor 31, and plural blades 34 fixed to the main plate 33. The impeller 30 is configured to suck in the air introduced into the inside/outside air box 10 and passing through the filter 20 from one side in the axial direction, and blow it out in the radial direction. A blade partition wall 35 is provided between the blades 34 to partition the air flowing in the upper region of the blade 34 in the axial direction and the air flowing in the lower region of the blade 34 in the axial direction.

Figure 2:
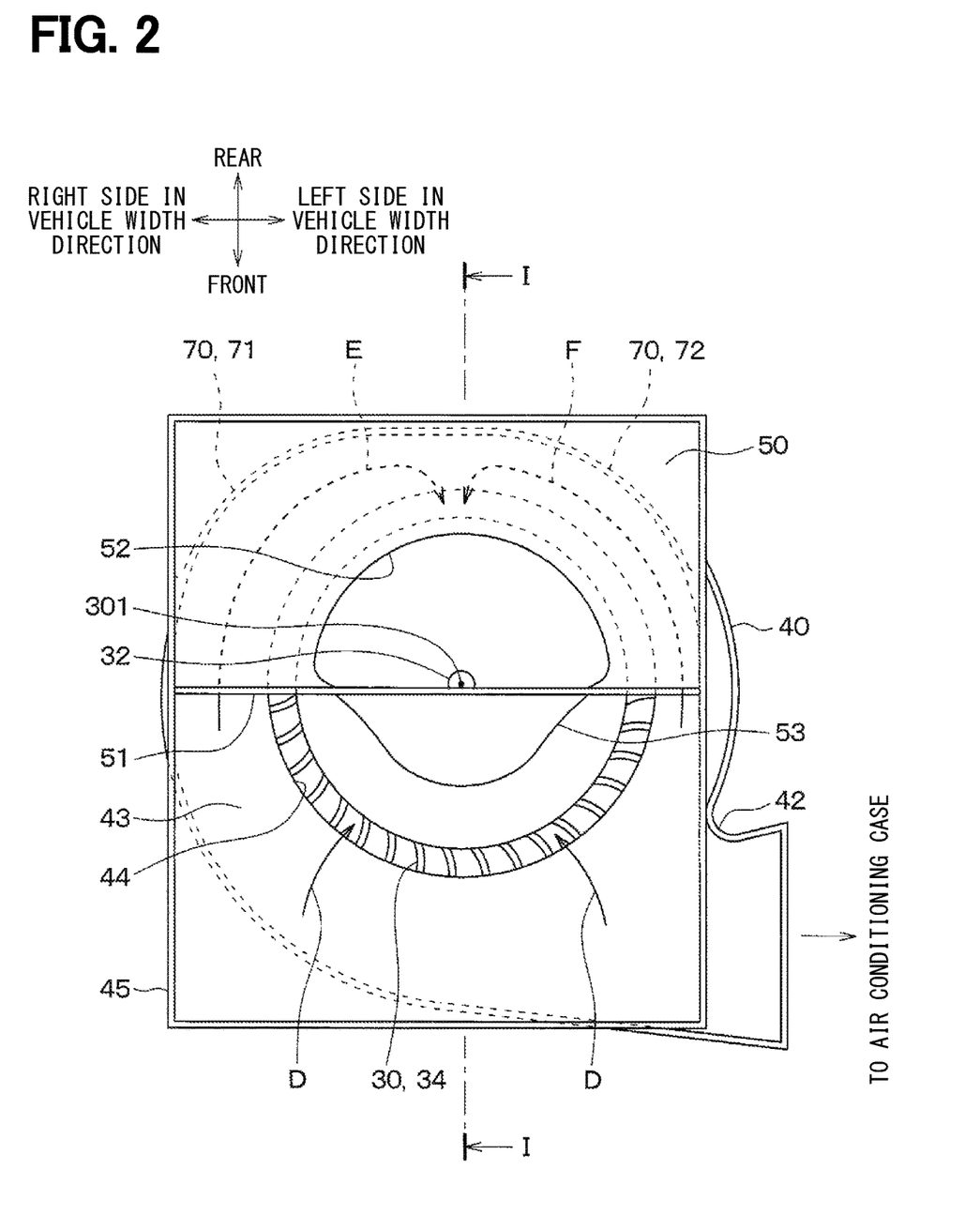
FIG. 2 is a cross-sectional view taken along a line II-II in FIG. 1.

The casing 40 is a scroll casing that surrounds the radially outer side of the impeller 30. The casing 40 forms a ventilation passage 41 on the radially outer side of the impeller 30. The ventilation passage 41 is mainly formed between a rear edge 36 of the blade 34 of the impeller 30 and the inner wall of the casing 40. The ventilation passage 41 has a nose portion 42 provided on a part of the outer periphery thereof, and is shaped such that the flow path area gradually expands from the nose portion 42 toward one side in the circumferential direction. A part of the ventilation passage 41 having the largest flow path area communicates with an air conditioning casing (not shown) of the air conditioner. The air blown out from the ventilation passage 41 of the casing 40 is introduced into the air conditioning casing.

Although not shown, an evaporator, a heater core, an air mix door, and the like are arranged in the air conditioning casing for adjusting the temperature and humidity of air. The air conditioned in temperature and humidity in the air conditioning casing is blown into the cabin from a face outlet, a foot outlet, a defroster outlet, and the like.

An annular bell mouth 44 forming an air suction port to the impeller 30 is provided on an upper surface 43 of the casing 40 facing the filter 20 in the rotation axis direction of the impeller 30. Further, a mounting frame 45 is provided on the upper surface 43 of the casing 40, for mounting the inside/outside air box 10 and the filter 20. That is, the inside/outside air box 10 and the filter 20 are mounted on the mounting frame 45. The outer shape of the mounting frame 45 is also formed in a rectangular shape when viewed from the upper side.

A partition wall 46 is provided inside the casing 40 for partitioning the ventilation passage 41 into one region in the axial direction of the impeller 30 and the other region in the axial direction of the impeller 30. The partition wall 46 is provided at a position corresponding to the blade partition wall 35 between the blades 34 of the impeller 30. In the following description, the region of the ventilation passage 41 upper than the partition wall 46 will be referred to as an upper ventilation passage 47, and the region of the ventilation passage 41 lower than the partition wall 46 will be referred to as a lower ventilation passage 48.

The baffle plate 50 as a plate-like member is provided between the casing 40 and the filter 20. The baffle plate 50 has a rectangular outer shape when viewed from the upper side. The baffle plate 50 is provided with a predetermined gap relative to the upper surface 43 and the bell mouth 44 of the casing 40. Further, the baffle plate 50 is provided so as to cover a part of the upper surface 43 of the casing 40, the bell mouth 44 and the impeller 30 in the rotation axis direction. Specifically, the baffle plate 50 covers substantially half of the upper surface 43 of the casing 40, the bell mouth 44, and the impeller 30 in the rotation axis direction.

As shown in FIG. 1, the baffle plate 50 has an outer edge 51 located adjacent to the rotation shaft 301 of the impeller 30. When the second switching door 15 of the inside/outside air box 10 fully opens the second inside air introduction port 13, the outer edge 51 is provided at a position below an end portion 16 of the second switching door 15 facing the filter 20. An air inlet portion 52 is formed in the baffle plate 50 at a position corresponding to a radially inner region of the impeller 30. The air inlet portion 52 communicates with the flow path inside the separation cylinder 53.

The separation cylinder 53 is formed in a tubular shape in the radially inner region of the impeller 30. The baffle plate 50 and the separation cylinder 53 are integrally formed to form a funnel shape. The separation cylinder 53 is shaped to expand radially outward from the air inlet portion 52 formed in the baffle plate 50 through the radially inside of the impeller 30. An end 54 of the separation cylinder 53 opposite to the baffle plate 50 is located at a position corresponding to the blade partition wall 35 provided between the blades 34 of the impeller 30 (that is, at the inner side of the blade partition wall 35 in the radial direction).

Figure 3:
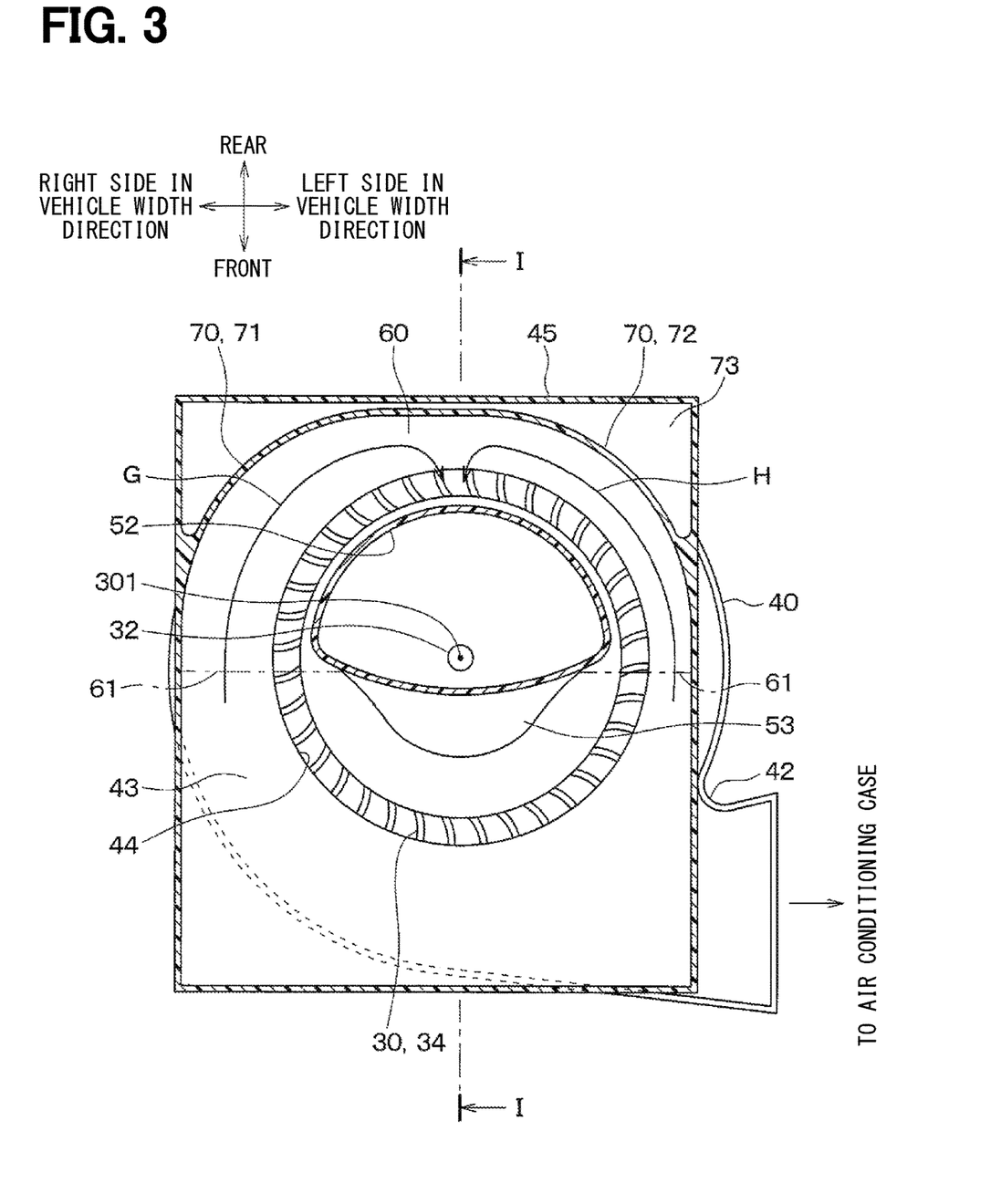
FIG. 3 is a cross-sectional view taken along a line III-III in FIG. 1.
Figure 4:
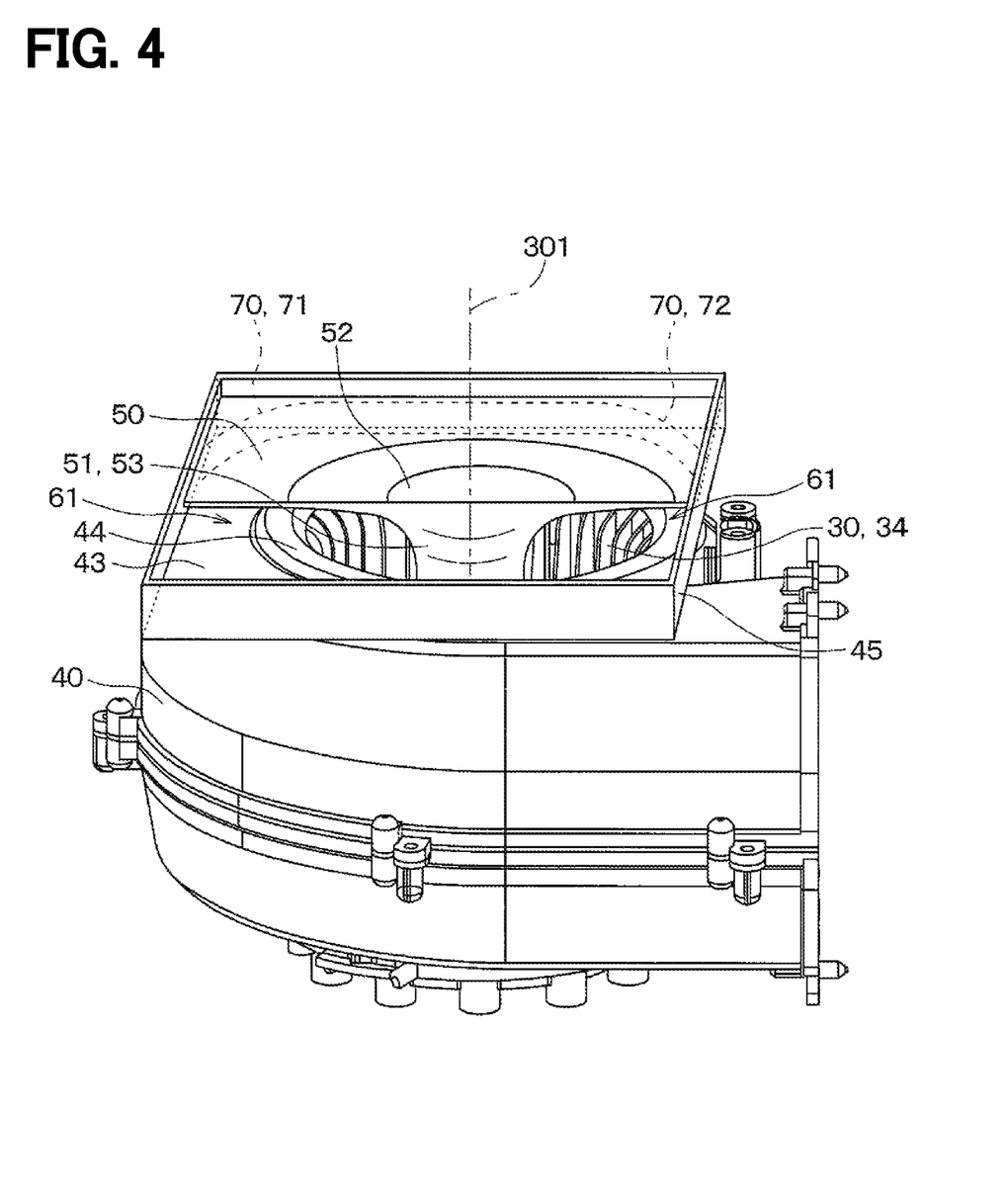
FIG. 4 is a perspective view illustrating the blower of the first embodiment excluding an inside/outside air box.

A gap passage 60 is formed between the baffle plate 50 and the upper surface 43 of the casing 40. The gap passage 60 is formed on the radially outer side of the separation cylinder 53. A part of the air flowing from the inside/outside air box 10 through the filter 20 to the region other than the baffle plate 50 flows into the gap passage 60. In the present embodiment, the air passing through the filter 20 flows into the gap passage 60 through an opening 61 of the gap passage 60. That is, the opening 61 of the gap passage 60 is formed between the outer edge 51 of the baffle plate 50 facing the rotation shaft 301 of the impeller 30 and the upper surface 43 of the casing 40. In FIG. 3, the position of the opening 61 of the gap passage 60 is indicated by a single chain line. This also applies to the drawing referred to in the second to fourth embodiments and a comparative example described later.

The guide rib 70 is provided in a portion of the gap passage 60 opposite to the opening 61. The guide rib 70 is a wall provided between the casing 40 and the baffle plate 50 to have a height in a direction along the rotation shaft 301 of the impeller 30. The guide rib 70 is integrally formed with the casing 40.

The guide rib 70 is provided at least at a position corresponding to a corner portion of the baffle plate 50 so that the inner wall of the gap passage 60 has a curved surface shape. The guide rib 70 guides the air flowing through the gap passage 60 in the circumferential direction of the bell mouth 44. Therefore, the guide rib 70 is formed in a curved surface shape along the bell mouth 44. The curvature of the curved surface of the guide rib 70 may be different from the curvature of the bell mouth 44.

The guide rib 70 of the present embodiment is integrally formed with the baffle plate 50 from one corner to the other corner of the baffle plate 50. The guide rib 70 has a left portion 71 provided at one corner of the baffle plate 50 and a right portion 72 provided at the other corner of the baffle plate 50. The left portion 71 and the right portion 72 may be produced separately from each other.

A space 73 is formed between the guide rib 70 and the mounting frame 45. As a result, the thickness of the guide rib 70 can be reduced, so as to decrease the material cost.

Air introduced into the inside/outside air box 10 and passing through a predetermined area of the filter 20 flows to the baffle plate 50. The air passes through the air inlet portion 52 formed in the baffle plate 50 and inside of the separation cylinder 53. Then, the air flows to the lower ventilation passage 48 via the impeller 30.

Air introduced into the inside/outside air box 10 and passing through the other area of the filter 20 flows to a region other than the baffle plate 50. Then, the air passes through the outside of the separation cylinder 53 and the gap passage 60, and flows to the upper ventilation passage 47 through the impeller 30. The predetermined area of the filter 20 is, for example, an area of the filter 20 on the rear side of a portion in contact with the end portion 16 of the second switching door 15. Further, the other area of the filter 20 is, for example, an area of the filter 20 on the front side of the portion in contact with the end portion 16 of the second switching door 15.

In FIG. 1, the first switching door 14 closes the first inside air introduction port 12 while the outside air introduction port 11 is opened. The second switching door 15 opens the second inside air introduction port 13. In such a state, the blower 1 can simultaneously draw and blow the inside air and the outside air in the separated state.

Specifically, as shown by an arrow A in FIG. 1, the inside air introduced from the second inside air introduction port 13 passes through a region of the filter 20 substantially directly above the baffle plate 50. Then, the air passes through the inside of the separation cylinder 53 from the air inlet portion 52 formed in the baffle plate 50. The air flows into the lower ventilation passage 48 via the impeller 30.

On the other hand, as shown by arrows B and C in FIG. 1, the outside air introduced from the outside air introduction port 11 passes through a region of the filter 20 other than the region substantially directly above the baffle plate 50, and passes through the outside of the separation cylinder 53. The air is sucked into the impeller 30, and flows into the upper ventilation passage 47.

Specifically, as shown by the arrow B in FIG. 1 and an arrow D in FIG. 2, a part of the air flowing through the region other than the baffle plate 50 is radially sucked into the impeller 30 as it is. Further, as shown by the arrow C in FIG. 1, arrows E and F in FIG. 2, and arrows G and H in FIG. 3, the other air flowing in the region other than the baffle plate 50 enters the gap passage 60 from the opening 61 of the separation cylinder 53 located on the left side and the right side. The air is sucked into the impeller 30 from the bell mouth 44. In the present specification, the air flowing into the gap passage 60 to be sucked into the impeller 30 while flowing in a direction intersecting the rotation shaft 301 of the impeller 30 is referred to as "lateral suction". That is, in the blower 1, a part of the air flowing through the region other than the baffle plate 50 is radially sucked into the impeller 30, and the other air flows through the gap passage 60 and is sucked into the impeller 30 as the lateral suction.

Figure 9:
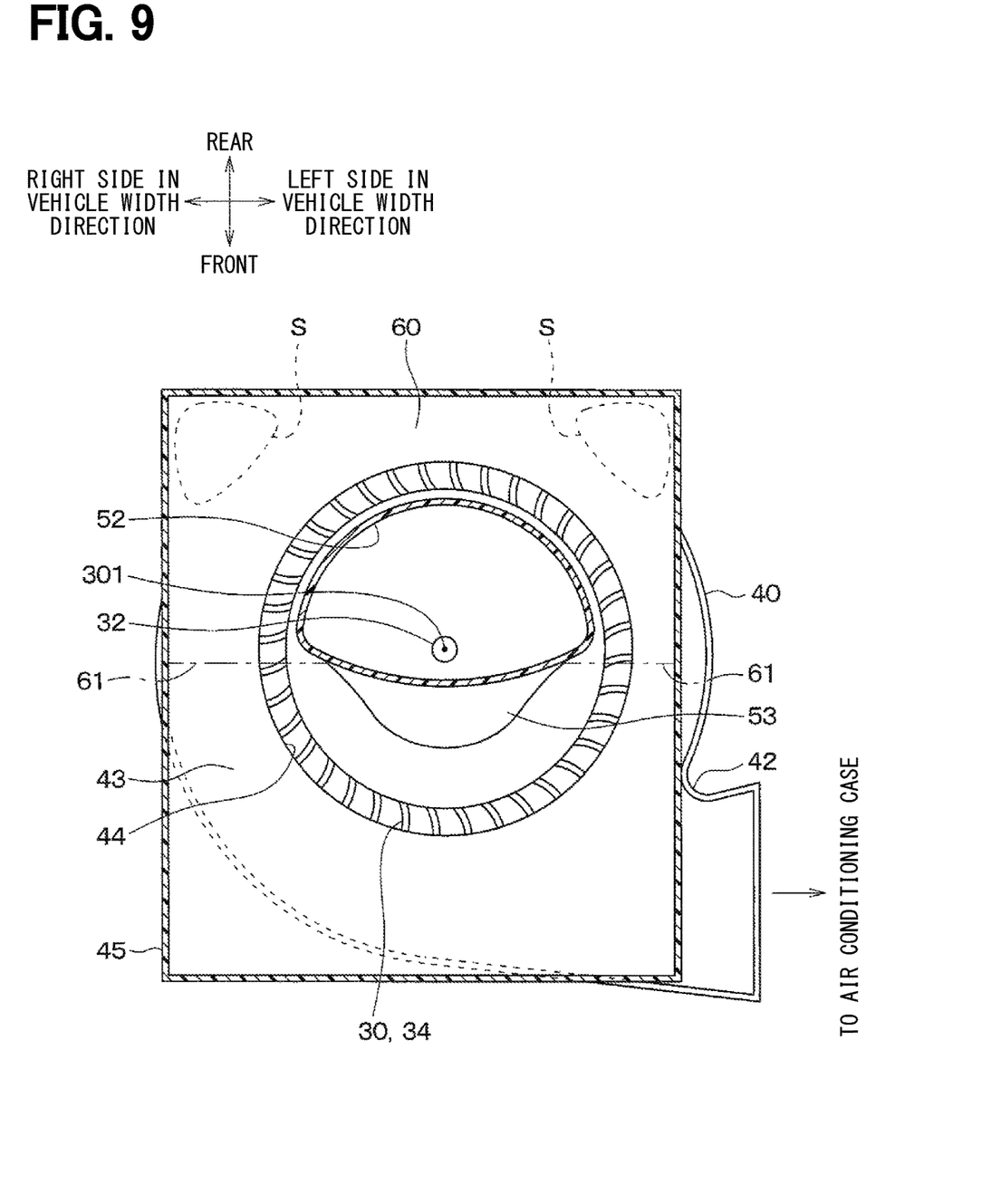
FIG. 9 is a cross-sectional view illustrating a part of a blower of a comparative example, corresponding to FIG. 3.

In a comparative example shown in FIG. 9, the guide rib 70 is not provided in the gap passage 60. The lateral suction is not produced by air flowing in the gap passage 60. Air may stagnate in a dash-line area S near the corner of the baffle plate 50 in the gap passage 60. In that case, the pressure loss of air sucked into the impeller 30 from the inside/outside air box 10 through the gap passage 60 increases, and the amount of air blown by the blower 1 decreases.

In contrast to such a comparative example, according to the present embodiment, the guide rib 70 is provided at a position corresponding to the corner portion of the baffle plate 50 in the gap passage 60. The guide rib 70 is provided so that the inner wall of the gap passage 60 has a curved surface shape. As a result, the air flowing through the gap passage 60 is guided in the circumferential direction of the bell mouth 44 along the curved surface shape of the guide rib 70, and is sucked into the impeller 30 from the radially inside of the bell mouth 44. Therefore, it is possible to reduce the stagnation of air in the gap passage 60.

As shown by the arrow G in FIG. 3, the air flowing into the gap passage 60 from the opening 61 on one side in the radial direction across the separation cylinder 53 is guided in the circumferential direction of the bell mouth 44 by the left portion 71 of the guide rib 70. On the other hand, as shown by the arrow H in FIG. 3, the air flowing into the gap passage 60 from the opening 61 on the other side in the radial direction across the separation cylinder 53 is guided in the circumferential direction of the bell mouth 44 by the right portion 72 of the guide rib 70. Therefore, the flows of air collide with each other in the gap passage 60 to merge and sucked into the impeller 30. As a result, the air flowing through the gap passage 60 is laminarized and easily sucked into the impeller 30. Therefore, the blower 1 of the present embodiment can reduce the pressure loss of air sucked into the impeller 30 from the inside/outside air box 10 through the gap passage 60, and can increase the amount of air blown by the blower 1. Further, in the blower 1 of the present embodiment, the gap passage 60 between the baffle plate 50 and the upper surface 43 of the casing 40 can be made smaller, and the physique can be reduced in the height direction.

The first embodiments is modified in second and third embodiments. The second and third embodiments are different from the first embodiment in the configuration of the guide rib 70, and the other parts are the same as those of the first embodiment. Therefore, only the parts different from the first embodiment will be explained.

Second Embodiment

Figure 5:
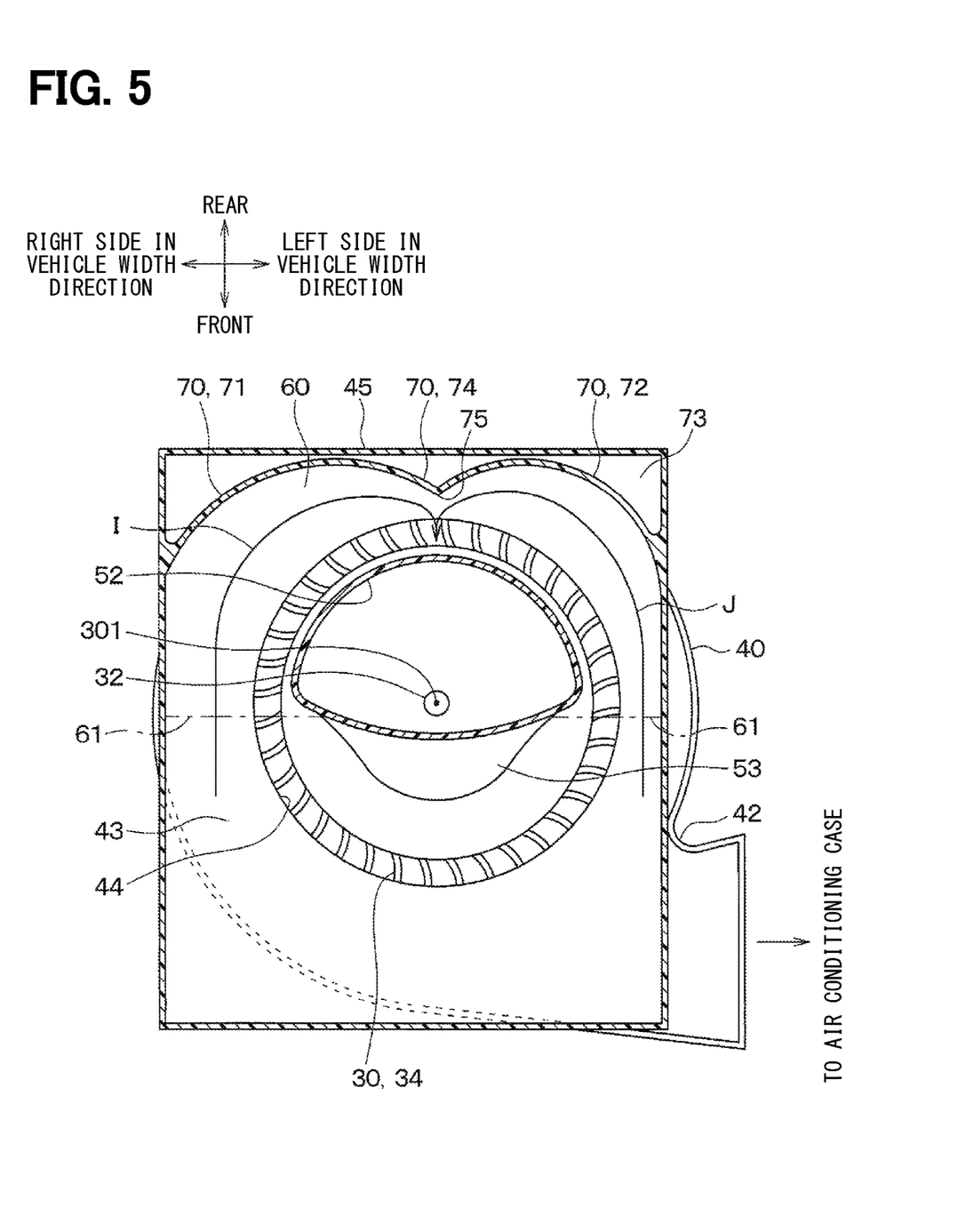
FIG. 5 is a cross-sectional view illustrating a part of a blower according to a second embodiment, corresponding to FIG. 3.

As shown in FIG. 5, the guide rib 70 of the second embodiment has a protrusion 74 at a part of the gap passage 60 opposite to the opening 61. The protrusion 74 has a convex shape with a tip portion 75 protruding toward the bell mouth 44. The protrusion 74 extends from the tip portion 75 toward the mounting frame 45 (that is, toward the outer wall of the casing 40). The guide rib 70 integrally has the left portion 71 provided to face the one corner of the baffle plate 50, the right portion 72 provided to face the other corner of the baffle plate 50, and the protrusion 74. That is, the guide rib 70 is integrally formed from one corner side of the baffle plate 50 to the other corner side of the baffle plate 50. In the second embodiment, the tip portion 75 of the protrusion 74 of the guide rib 70 is provided so as to face the rotation shaft 301 of the impeller 30.

In the second embodiment, as shown by the arrow I in FIG. 5, the air flowing into the gap passage 60 from the one opening 61 is guided by the left portion 71 shaped in the curved surface and the protrusion 74 of the guide rib 70, inward in the radial direction of the bell mouth 44. On the other hand, as shown by the arrow J in FIG. 5, the air flowing into the gap passage 60 from the other opening 61 is guided by the right portion 72 shaped in the curved surface and the protrusion 74 of the guide rib 70, inward in the radial direction of the bell mouth 44. Then, the two flows of air merge and sucked into the impeller 30 from the radially inside of the bell mouth 44. That is, the guide rib 70 of the second embodiment is shaped to easily guide the two flows of air flowing through the gap passage 60 inward in the radial direction of the bell mouth 44 due to the protrusion 74 protruding toward the bell mouth 44. Therefore, the blower 1 can reduce the pressure loss of air flowing through the gap passage 60 and increase the amount of air blown by the blower 1.

Third Embodiment

Figure 6:
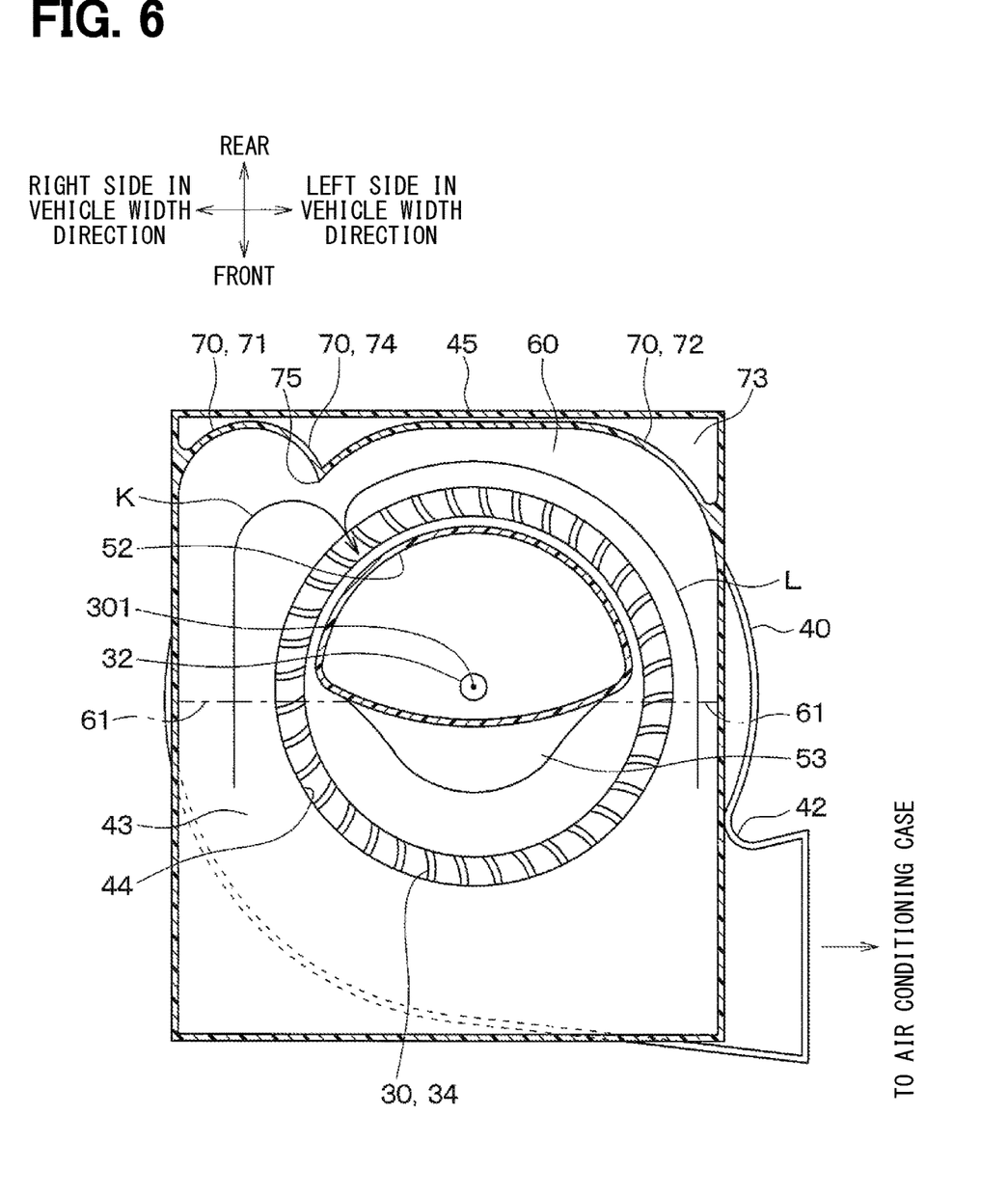
FIG. 6 is a cross-sectional view illustrating a part of a blower according to a third embodiment, corresponding to FIG. 3.

As shown in FIG. 6, in the third embodiment, the tip portion 75 of the protrusion 74 of the guide rib 70 is shifted to a position deviated from the rotation shaft 301 of the impeller 30. Specifically, the tip portion 75 of the protrusion 74 is provided on the side far from the nose portion 42 with respect to the rotation shaft 301 of the impeller 30. The position of the tip portion 75 of the protrusion 74 is appropriately set in consideration of the rotation direction of the impeller 30 and the flow of air changed by the flow path area of the gap passage 60 on the left and right of the separation cylinder 53. Therefore, the tip portion 75 of the protrusion 74 may be provided on the side closer to the nose portion 42 with respect to the rotation shaft 301 of the impeller 30.

In the third embodiment, as shown by the arrow K in FIG. 6, the air flowing into the gap passage 60 from the one opening 61 is guided by the left portion 71 shaped in the curved surface and the protrusion 74 of the guide rib 70, inward in the radial direction of the bell mouth 44. On the other hand, as shown by the arrow L in FIG. 6, the air flowing into the gap passage 60 from the other opening 61 is guided by the right portion 72 shaped in the curved surface and the protrusion 74 of the guide rib 70, inward in the radial direction of the bell mouth 44. Then, the two flows of air merge and sucked into the impeller 30 from the radially inside of the bell mouth 44. That is, the guide rib 70 of the third embodiment also has the protrusion 74 protruding toward the bell mouth 44, so that the two flows of air flowing through the gap passage 60 can be easily guided inward in the radial direction of the bell mouth 44. Therefore, the blower 1 can reduce the pressure loss of air flowing through the gap passage 60 and increase the amount of air blown by the blower 1.

Fourth Embodiment

A fourth embodiment will be described. In the first to third embodiments, the one-sided suction type centrifugal blower sucks air from only one side in the rotation axis direction of the impeller 30. In the fourth embodiment, a double-sided suction type centrifugal blower sucks air from both sides in the rotation axis direction of the impeller 30. The blower 1 of the fourth embodiment is also used in a two-layer flow type air conditioner for a vehicle, in which inside air and outside air can be simultaneously blown out while the inside air and the outside air are separated from each other.

Figure 7:
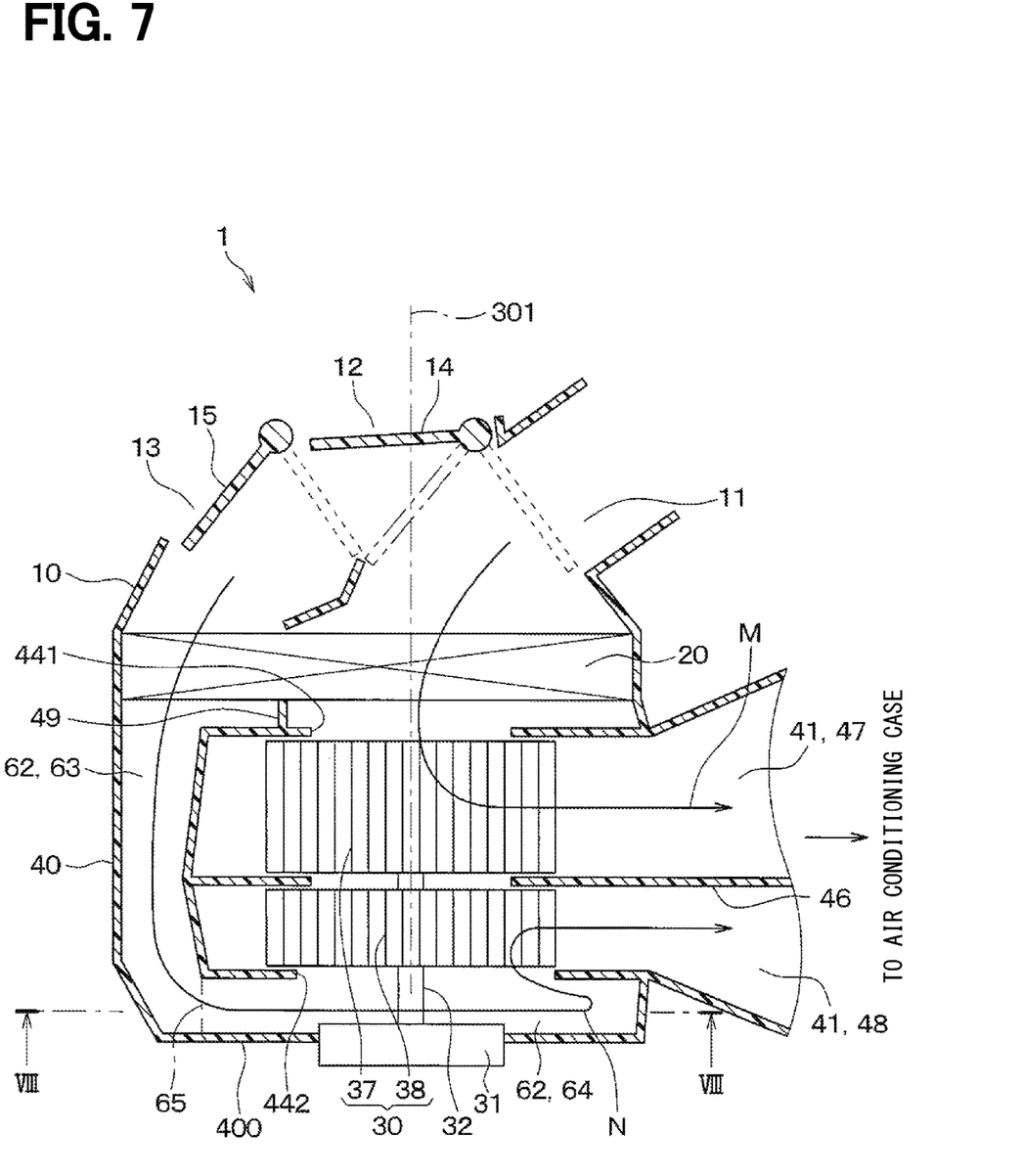
FIG. 7 is a cross-sectional view of a blower according to a fourth embodiment.
Figure 8:
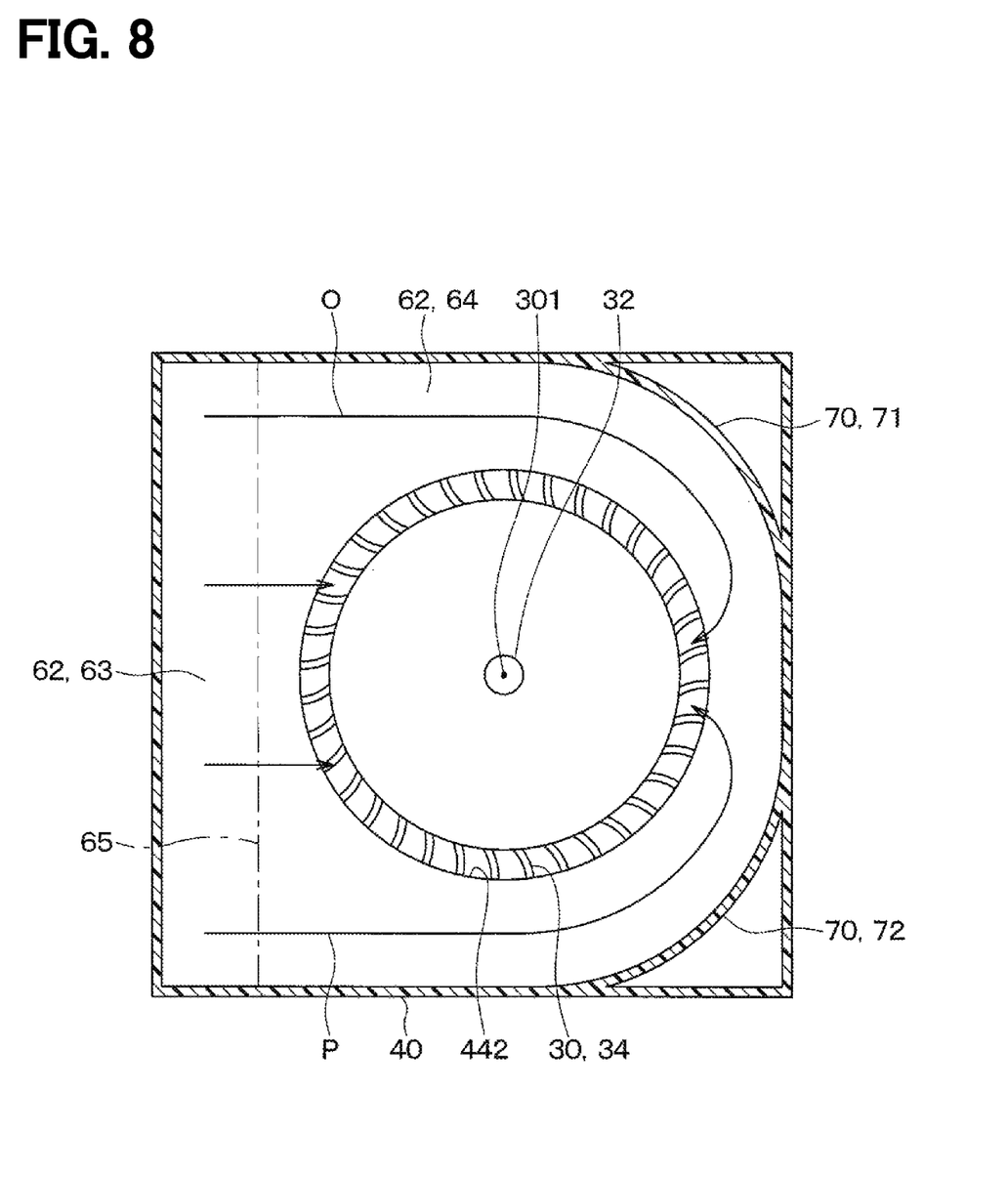
FIG. 8 is a cross-sectional view taken along a line VIII-VIII in FIG. 7.

As shown in FIGS. 7 and 8, the blower 1 of the fourth embodiment includes the inside/outside air box 10, the impeller 30, the casing 40, the partition wall 46, and the guide rib 70. The impeller 30 has an upper impeller 37 and a lower impeller 38. The upper impeller 37 is arranged in the upper ventilation passage 47, and the lower impeller 38 is arranged in the lower ventilation passage 48. The upper impeller 37 and the lower impeller 38 are rotated integrally by the motor 31.

A partition plate 49 is provided between the upper surface 43 of the casing 40 and the filter 20 to separate air passing through a predetermined region of the filter 20 from air passing through the other region of the filter 20. Therefore, as shown by the arrow M in FIG. 7, the air introduced into the inside/outside air box 10 and passing through the predetermined region of the filter 20 is sucked into the upper impeller 37 from the upper bell mouth 441 to flow through the upper ventilation passage 47.

Further, the casing 40 has a connecting passage 62 for sending the air that has passed through the other region of the filter 20 to the lower impeller 38. The connecting passage 62 has a vertical passage 63 extending substantially parallel to the rotation shaft 301 of the impeller 30 and a lateral passage 64 extending in a direction intersecting the rotation shaft 301 of the impeller 30. In the fourth embodiment, the lateral passage 64 corresponds to a gap passage. A bottom plate 400 of the casing 40 forming the lateral passage 64 corresponds to a plate-shaped member.

In the fourth embodiment, the lateral passage 64 has an opening 65 where the air flows from the vertical passage 63 to the lateral passage 64. In FIGS. 7 and 8, the position of the opening 65 of the lateral passage 64 is indicated by a single chain line.

As shown in FIG. 8, the guide rib 70 is provided in the lateral passage 64 at a position opposite to the opening 65. The guide rib 70 is provided at least at a position corresponding to the left and right corners of the bottom plate 400 of the casing 40 so that the inner wall of the lateral passage 64 has a curved surface shape. The guide rib 70 guides the air flowing through the lateral passage 64 in the circumferential direction of the lower bell mouth 442.

As shown by the arrow N in FIG. 7, the air introduced into the inside/outside air box 10 and passing through the other region of the filter 20 flows from the vertical passage 63 to the lateral passage 64, and is sucked into the lower impeller 38 from the lower bell mouth 442 to flow into the lower ventilation passage 48. Specifically, as shown by the arrows O and P in FIG. 8, the air flowing from the opening 65 of the lateral passage 64 to the lateral passage 64 is guided in the circumferential direction of the lower bell mouth 442 along the curved surface shape of the guide rib 70. Then, the air is sucked into the lower impeller 38 from the radially inside of the lower bell mouth 442. Therefore, in the fourth embodiment, the flow of air in the lateral passage 64 is so-called lateral suction. Further, also in the fourth embodiment, it is possible to restrict the stagnation of air in the lateral passage 64 by providing the guide rib 70 in the lateral passage 64.

Further, as shown by the arrows O and P in FIG. 8, the air flowing into the lateral passage 64 from the opening 65 is guided in the circumferential direction of the lower bell mouth 442 by the left portion 71 and the right portion 72 of the guide rib 70. Then, the flows of air collide with each other in the lateral passage 64 to merge, and are sucked into the impeller 30. As a result, the air flowing through the lateral passage 64 is laminarized and easily sucked into the impeller 30. Therefore, the blower 1 of the fourth embodiment can also reduce the pressure loss of air sucked into the impeller 30 from the inside/outside air box 10 through the vertical passage 63 and the lateral passage 64, and increase the amount of air blown by the blower 1.

Other Embodiments

The present disclosure is not limited to the embodiments described above, and can be modified as appropriate. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Also, the shape, the positional relationship, and the like of the component or the like mentioned in the above embodiments are not limited to those being mentioned unless otherwise specified, limited to the specific shape, positional relationship, and the like in principle, or the like. The terms such as "upper", "lower", "left", "right", "front" and "rear" are used for convenience in the explanation of each embodiment, and do not limit the direction in which the blower is installed in a vehicle or the like.

(1) In each of the embodiments, the blower 1 is used for an air conditioner having two layers of inside air and outside air, but is not limited to this. The blower 1 may be used for an air conditioner having a single layer.

(2) The blower 1 is applicable to structures, for example, in which a plate-shaped member is arranged to obstruct the flow of air to the bell mouth 44, the height of the gap passage 60 is small, and it is difficult for the impeller 30 to radially suck air.

(3) In each of the embodiments, the blower 1 has been described as a centrifugal blower, but the blower 1 is not limited to. Various types of blowers such as an axial blower may be adopted.

(4) In each of the embodiments, the guide rib 70 has a curved surface shape, but is not limited to this. The guide rib 70 may have a planar shape.

(5) In the embodiments, the outside air flows through the upper ventilation passage 47 and the inside air flows through the lower ventilation passage 48, but are not limited. In the blower 1, only the outside air or only the inside air flows through both the upper ventilation passage 47 and the lower ventilation passage 48 by adjusting the positions of the first switching door 14 and the second switching door 15 of the inside/outside air box 10. It is also possible to mix the inside air and the outside air to flow.

(6) In the embodiments, the inside/outside air box 10 has the outside air introduction port 11, the first inside air introduction port 12, and the second inside air introduction port 13 in this order from the front side of the vehicle, but is not limited to this. In the inside/outside air box 10, the outside air introduction port 11, the first inside air introduction port 12, and the second inside air introduction port 13 may be arranged in the vehicle width direction, or may be arranged in this order from the rear side of the vehicle. Moreover, the outside air introduction port 11, the first inside air introduction port 12, and the second inside air introduction port 13 may be arranged diagonally.

OVERVIEW

According to the first aspect shown in part or all of the above embodiments, a blower includes: an air box into which outside air and inside air are introduced; an impeller that is rotated by a motor to suck and blow out air introduced into the air box; a casing having a bell mouth that forms an air suction port to the impeller, the casing forming a ventilation passage on an outer side of the impeller in a radial direction; and a plate-shaped member provided with a predetermined gap relative to the casing and the bell mouth. The plate-shaped member covers at least a part of the casing, the bell mouth, and the impeller in an axial direction. A gap passage is defined between the casing and the plate-shaped member such that air flowing into the gap passage flows in a direction intersecting a rotation axis of the impeller and is sucked into the impeller from the bell mouth. A guide rib is provided at a part of the gap passage opposite to an opening through which air flows into the gap passage. The guide rib guides air flowing through the gap passage in a circumferential direction of the bell mouth.

According to the second aspect, the plate-shaped member has a rectangular shape when viewed from the axial direction. The guide rib is provided at least at a position corresponding to the corner of the plate-shaped member so that the inner wall of the gap passage has a curved surface shape. Accordingly, the air flowing through the gap passage is guided along the curved surface shape of the guide rib. Therefore, it is possible to restrict stagnation of air at the corner of the plate-shaped member and reduce the pressure loss of air flowing through the gap passage.

According to the third aspect, the guide rib is a wall provided between the casing and the plate-shaped member so as to have a height in the axial direction. Accordingly, the manufacturing cost can be reduced by the reduction in the thickness of the guide rib.

According to the fourth aspect, the blower further includes: a partition wall that partitions the ventilation passage into an upper passage on one side in the axial direction and a lower passage on the other side in the axial direction; and a separation cylinder shaped to expand outward in the radial direction from an air inlet portion formed in the plate-shaped member through a radially inside of the impeller. The separation cylinder is provided such that the air flowing from the air box to the plate-shaped member flows from the air inlet portion through inside of the separation cylinder to the lower passage through the impeller, and such that the air flowing from the air box to a region other than the plate-shaped member flows through outside of the separation cylinder and the gap passage to the upper passage through the impeller.

Accordingly, the blower is used for an air conditioner of a two-layer flow type in which inside air and outside air can be simultaneously blown out in the separated state. The blower is a one-sided suction type that sucks air only one side of the impeller in the axial direction.

According to the fifth aspect, the guide rib has a protrusion protruding toward the bell mouth, and the protrusion has a tip portion and is shaped to gradually expand from the tip portion outward in the radial direction with respect to the bell mouth.

Accordingly, air flowing into the gap passage from one opening across the separation cylinder and air flowing into the gap passage from the other opening across the separation cylinder are guided inward in the radial direction of the bell mouth by the protrusion. Then, the two flows of air merge and are sucked into the impeller from the radially inside of the bell mouth. Therefore, it is possible to reduce the pressure loss of air flowing through the gap passage and increase the amount of air blown by the blower.

What is claimed is:

1. A blower comprising: an air box into which outside air and inside air are introduced; an impeller that is rotated by a motor to suck and blow out air introduced into the air box; a casing having a bell mouth that forms an air suction port to the impeller, the casing forming a ventilation passage on an outer side of the impeller in a radial direction; a plate-shaped member provided with a predetermined gap relative to the casing and the bell mouth, the plate-shaped member covering at least a part of the casing, the bell mouth, and the impeller in an axial direction; a gap passage defined between the casing and the plate-shaped member such that air flowing into the gap passage flows in a direction intersecting a rotation shaft of the impeller and is sucked into the impeller from the bell mouth; and a guide rib provided at a part of the gap passage opposite to a rectangular opening through which air flows into the gap passage, wherein the guide rib guides air flowing through the gap passage in a circumferential direction of the bell mouth, the plate-shaped member has a rectangular shape when viewed in the axial direction, and the plate-shaped member obscures a portion of a mounting frame in the axial direction revealing the opening.

2. The blower according to claim 1, wherein
the guide rib is provided at a position corresponding to at least a corner portion of the plate-shaped member so that an inner wall of the gap passage has a curved surface shape.

3. The blower according to claim 1, wherein the guide rib is a wall provided between the casing and the plate-shaped member to have a height in the axial direction.

4. The blower according to claim 1 further comprising:
a partition wall that partitions the ventilation passage into an upper passage on one side in the axial direction and a lower passage on the other side in the axial direction; and
a separation cylinder shaped to expand outward in the radial direction from an air inlet portion formed in the plate-shaped member through a radially inside of the impeller, wherein
the separation cylinder is provided such that the air flowing from the air box to the plate-shaped member flows from the air inlet portion through inside of the separation cylinder to the lower passage through the impeller, and such that the air flowing from the air box to a region other than the plate-shaped member flows through outside of the separation cylinder and the gap passage to the upper passage through the impeller.

5. The blower according to claim 1, wherein
the guide rib has a protrusion protruding toward the bell mouth, and
the protrusion has a tip portion and is shaped to gradually expand from the tip portion outward in the radial direction with respect to the bell mouth.

6. The blower according to claim 1, wherein
the opening of the gap passage is formed between an outer edge of the plate-shaped member facing the rotation shaft of the impeller and an upper surface of the casing.

7. The blower according to claim 1, wherein the guide rib is provided at a part of the gap passage opposite to the rectangular opening through which air flows into the gap passage, and the plate-shaped member obscures a portion of a mounting frame in the axial direction revealing the opening.

* * * * *